United States Patent [19]

Sumiya et al.

[11] Patent Number: 4,690,037
[45] Date of Patent: Sep. 1, 1987

[54] HYDRAULIC SERVO FOR FRICTION COUPLING ELEMENT OF AUTOMATIC TRANSMISSION

[75] Inventors: Koji Sumiya, Nishio; Kazuaki Watanabe; Seitoku Kubo, both of Toyota, all of Japan

[73] Assignees: Aisin-Warner Limited; Toyota Jidosha Kabushiki Kaisha, both of Japan

[21] Appl. No.: 759,827

[22] Filed: Jul. 29, 1985

[30] Foreign Application Priority Data

Jul. 31, 1984 [JP] Japan ................... 59-161905

[51] Int. Cl.⁴ .................................... F01B 31/00
[52] U.S. Cl. ......................... 92/130 R; 192/85 AA
[58] Field of Search ............... 92/54, 130 R; 74/766, 74/781 R; 192/85 AA, 85 CA, 85 C, 85 A

[56] References Cited

U.S. PATENT DOCUMENTS

| | | | |
|---|---|---|---|
| 2,804,780 | 9/1957 | Gerst | 192/85 AA |
| 3,353,641 | 11/1967 | Chana | 192/85 AA |
| 3,717,229 | 2/1973 | Perlick | 192/85 AA |
| 4,123,952 | 11/1978 | Wayman | 74/781 R |
| 4,368,652 | 1/1983 | Windish | 192/85 AA |

Primary Examiner—Edward K. Look
Attorney, Agent, or Firm—Pahl, Lorusso & Loud

[57] ABSTRACT

Described herein is a hydraulic servo suitable for friction coupling elements in automatic transmissions. The hydraulic servo of the invention is compact in construction and easy to assemble, including an annular drum rotatably or fixedly mounted in an automatic transmission case, a piston provided in a predetermined position of the drum, a return spring provided on the piston, and a connecting member for connecting the return spring and the piston, characterized in that the piston is provided with a guide sleeve at the tip end of one end face thereof for guiding one end of said connecting member.

5 Claims, 18 Drawing Figures

FIG. 4
FIG. 5
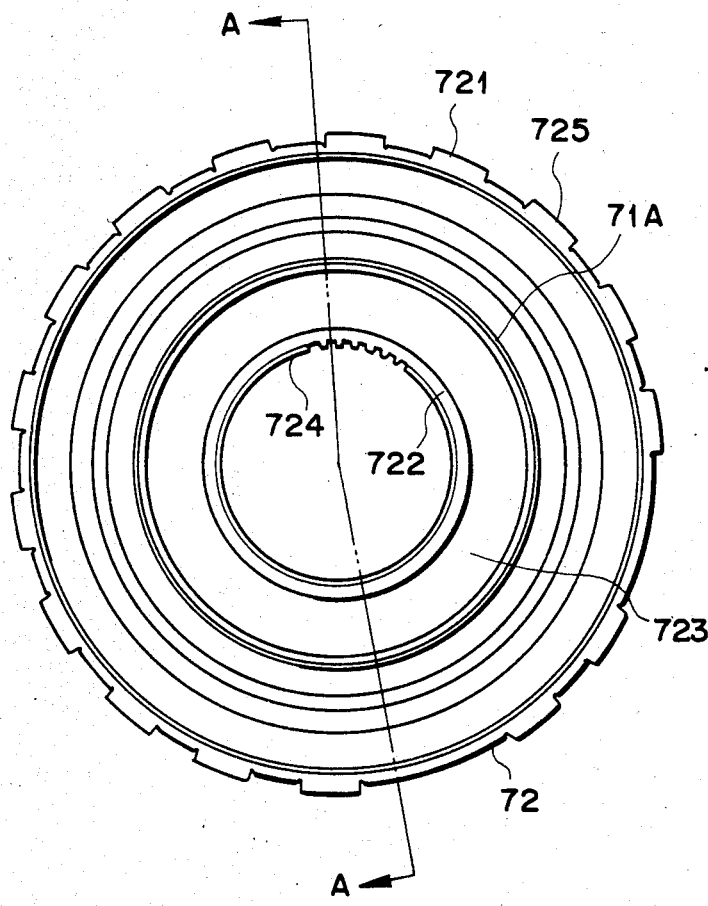
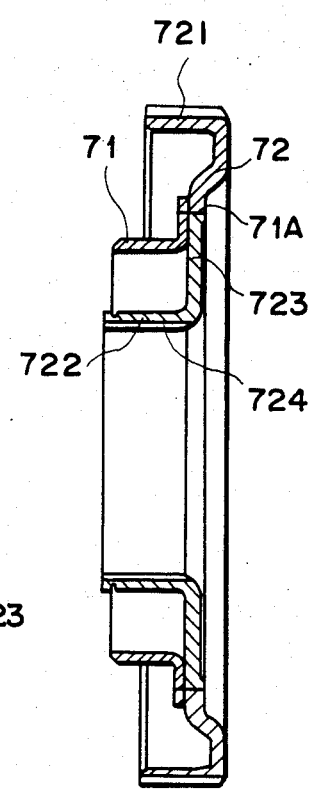

FIG. 6
FIG. 7
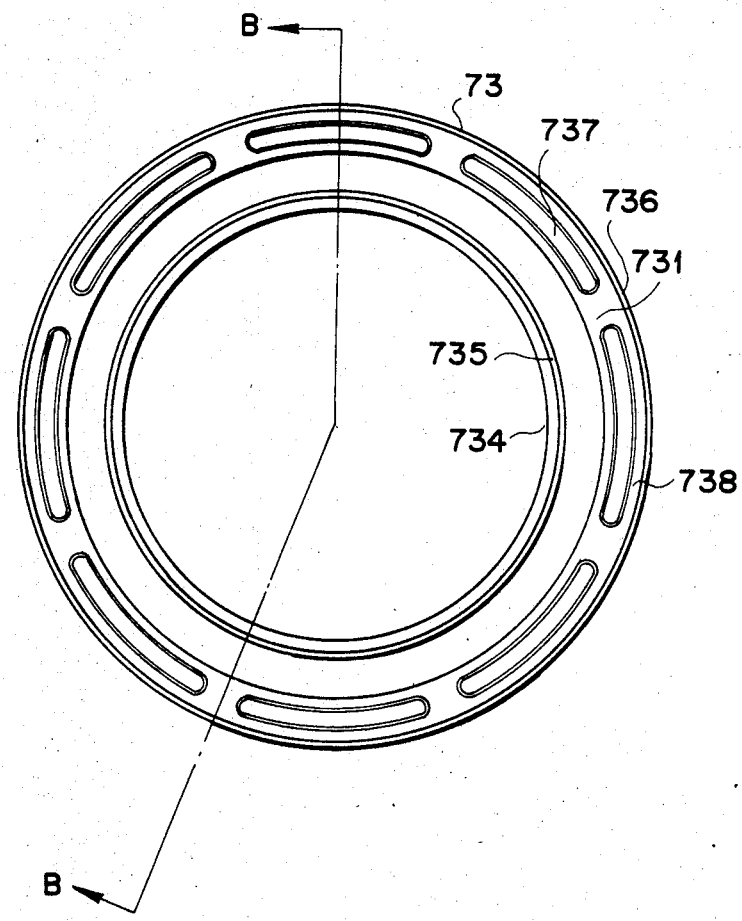
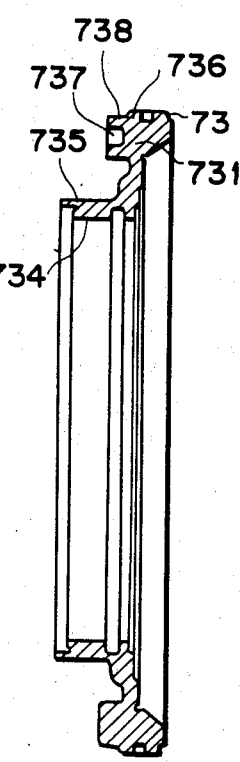

FIG. 15
FIG. 16
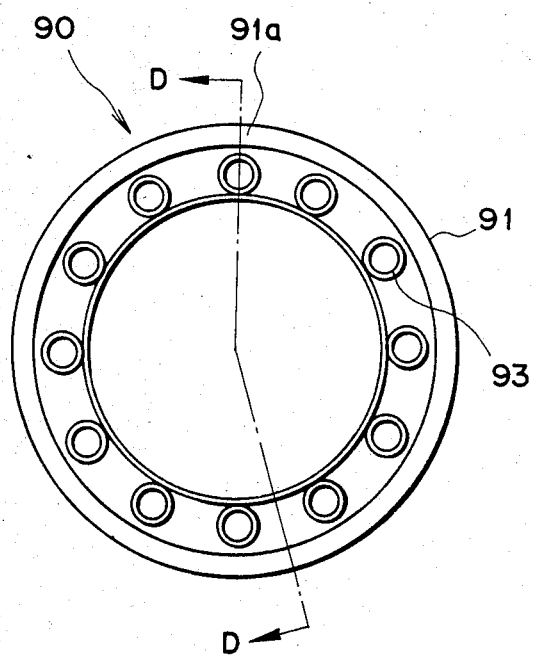
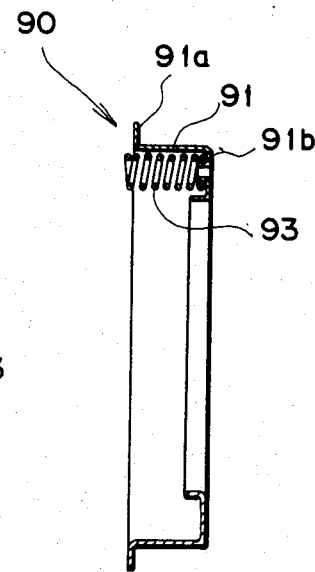

HYDRAULIC SERVO FOR FRICTION COUPLING ELEMENT OF AUTOMATIC TRANSMISSION

BACKGROUND OF THE INVENTION (i) Field of the Invention

This invention relates to a hydraulic servo for friction coupling elements in automatic transmissions.

(ii) Description of the Prior Art:

Heretofore, hydraulic servos for friction coupling elements in automatic transmissions have included an annular drum having an outer cylinder, an inner cylinder and a side wall connecting the two cylinders, fixed or rotatably mounted in the transmission case, a piston provided between the outer and inner cylinders of the drum, and a return spring located outward of the outer cylinder or on a wall portion of the piston, coupling and releasing the friction element by supplying and draining line pressure to and from a chamber between the drum and piston.

In a case where the return spring is located outward of the outer cylinder, however, the hydraulic servo of the friction coupling element unavoidably has large radial dimension. On the other hand, the arrangement in which the return spring is mounted on a wall portion of the piston has a drawback in that the hydraulic servo of the friction coupling element becomes lengthy in the axial direction. Further, when upshifting a vehicular automatic transmission from first to second speed, the outer race of a one-way clutch F2 is fixed to the automatic transmission case by engaging a friction brake B2. In this connection, the hydraulic servo B-2 which engages or releases this brake B2 has an annular hydraulic drum and a piston which is biased by a return spring, usually involving a wide piston mounting space between the outer and inner cylinders of the hydraulic drum. Therefore, there is little space for mounting the return spring unless the case is extended to a certain extent to secure the return spring mounting space. In addition, shift shocks occur on upshifts from first to second speed due to the use of a large piston. In order to solve the problem of shift shocks, we previously proposed a hydraulic servo for friction coupling elements of automatic transmissions (Japanese Patent Application No. 59-89075), employing a piston of an optimum area for a friction coupling element to suppress the shift shocks and at the same time to save a space for mounting piston return springs, providing a hydraulic servo of a compact construction which can be mounted in position without extending its mounting space in the axial or radial direction.

In addition, there has been a problem that, when assembling a connecting member with a piston, it tends to lose stability in the absence of a guide means which guides the tip end of the connecting member.

SUMMARY OF THE INVENTION

It is an object of the present invention to provide a hydraulic servo for friction couplers in automatic transmissions, which can overcome the abovementioned problems.

It is a more specific object of the invention to provide a hydraulic servo for friction couplers in automatic transmissions, which is provided with a guide sleeve at the tip end of an end face of the piston for guiding one end of a connecting member in such a manner as to facilitate assembly with the piston at an optimum position.

According to the present invention, there is provided a hydraulic servo 1 for friction devices in automatic transmissions, which includes as shown in FIG. 1: an annular drum 72 fixedly or rotatably mounted in a transmission case 130 and having an outer cylinder 721, an inner cylinder 722 and a side wall 723 connecting the two cylinders; an intermediate cylinder 71 provided at a suitable position on the drum 72; a piston fitted between the outer cylinder 71 and the intermediate cylinder 721; return springs 93 provided between the intermediate cylinder 71 and the inner cylinder 722; and a connecting member in the form of a spring seat 91 or the like connecting the return springs 93 and piston 73; characterized in that the hydraulic servo 1 is provided with a guide sleeve 73d at the tip end 73c on one end face 73b thereof on the inner peripheral side 73a of the piston 73 for guiding one end 91a of the connecting member.

The hydraulic servo of the above-described construction, which is arranged to guide one end of a connecting member by abutting that one end against the inner periphery of the guide sleeve when fixing the connecting member on the piston, thus ensuring fixation of the connecting member in a predetermined position and stability of operation in assembling return springs to the connecting member.

The above and other objects, features and advantages of the invention will become apparent from the following description and the appended claims, taken in conjunction with the accompanying drawings which show by way of example some preferred embodiments of the invention.

BRIEF DESCRIPTION OF THE DRAWINGS

In the accompanying drawings:

FIG. 4 is a front view of a hydraulic servo drum of the hydraulic servo according to the invention;

FIG. 5 is a schematic section taken on line A—A of FIG. 3;

FIG. 6 is a front view of a piston employed by the hydraulic servo according to the invention;

FIG. 7 is a schematic section taken on line B—B of FIG. 5;

FIG. 15 is a front view of a connecting member and a return spring in the hydraulic servo of the invention;

FIG. 16 is a section taken on line D—D of FIG. 15;

DESCRIPTION OF PREFERRED EMBODIMENTS

Figure 1:
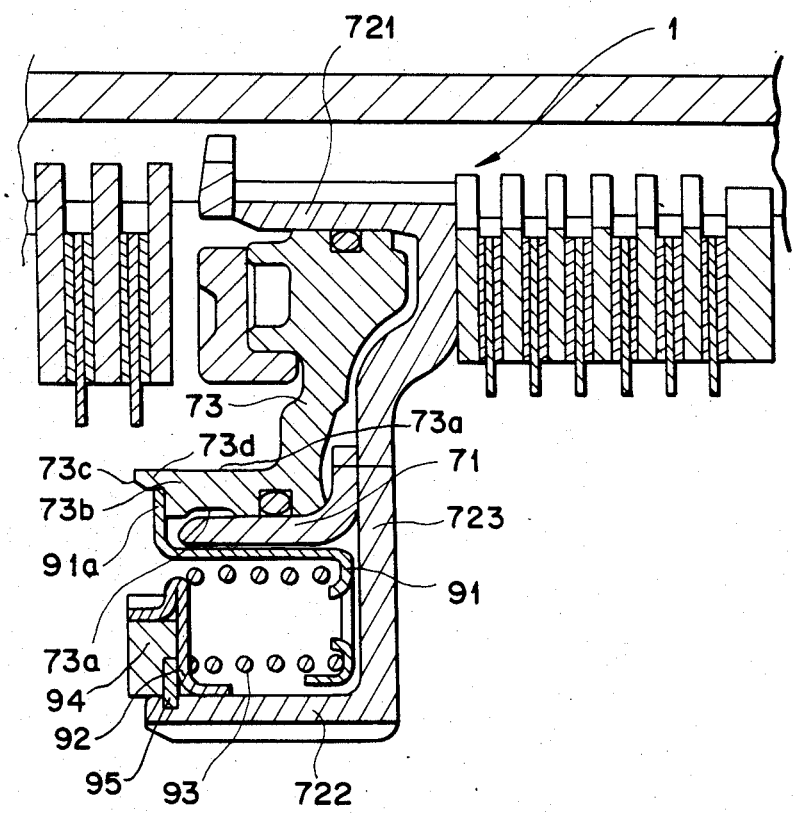
FIG. 1 is a schematic section showing major components of a hydraulic servo for a friction coupling device of an automatic transmission according to the invention.

Hereafter, the hydraulic servo of the invention which is suitable for use with a friction coupling device of a vehicular automatic transmission is described more particularly by way of the preferred embodiment shown in the drawings.

Figure 2:
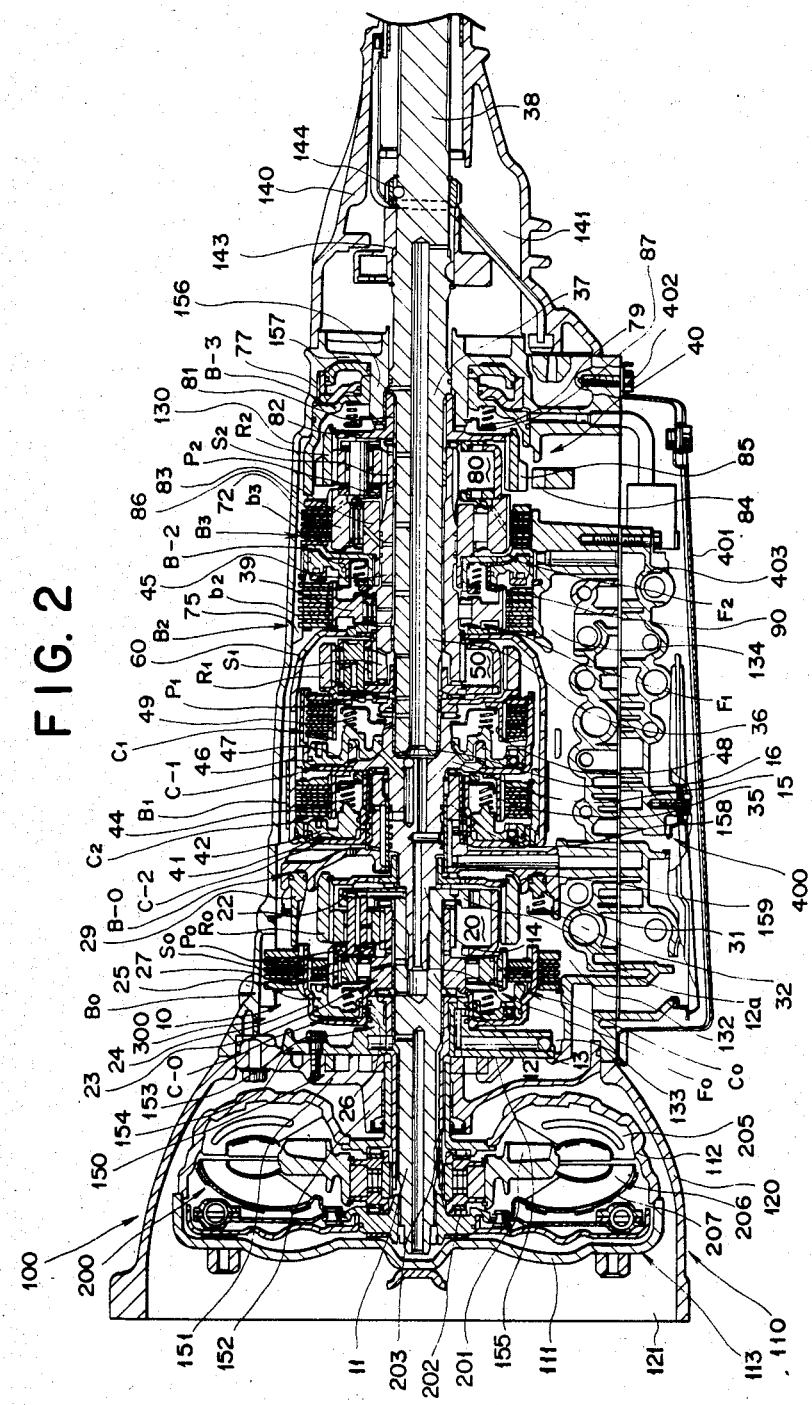
FIG. 2 is a schematic section of an automatic transmission incorporating the hydraulic servo according to the invention.

Referring to FIG. 2, the automatic transmission which is generally designated at 100 includes a fluid coupling 200 (a torque converter in the particular embodiment shown), a transmission 300, and a hydraulic control system 400.

The transmission 300 consists of: an overdrive planetary gear transmission 10 including a first planetary gear set 20, and multiple disk clutch C0, a multiple disk brake B0 and a one-way clutch F0 which are operated by hydraulic servos; and an underdrive planetary gear transmission with three forward speed and one reverse speed ranges, including a second planetary gear set 50, a third planetary gear set 80, and two multiple disk clutches C1 and C2, a belt brake B1, two multiple disk brakes B2 and B3, and two one-way clutches F1 and F2 which are operated by hydraulic servos.

The case 110 of the automatic transmission 100 includes: a torque converter housing 120 accommodating a torque converter 200; a transmission case 130 accommodating in series the overdrive planetary gear transmission and the underdrive planetary gear transmission; and an extension housing 140 covering the rear side of the automatic transmission 100. The torque converter housing 120, transmission case 130 and extension housing 140 are fastened together by a number of bolts.

The torque converter 200 is received in a torque converter compartment 121 of the torque converter housing 120, which is open on the front side (on the side facing the engine), and includes: a front cover 111 coupled with the output shaft of the engine; a rear cover 112 in the form of an annular plate welded at its outer periphery to the front cover 111; a pump impeller 205 provided on the inner wall around the inner periphery of the rear cover 112; a turbine runner 206 provided opposingly to the pump impeller 205; a turbine shell 207 retaining the turbine runner 206; a stator 201 supported on a fixed shaft 203 through a one-way clutch 202; and a direct coupling clutch (lock-up clutch) 113 for directly coupling the front cover 111 with the turbine shell 207. Mounted between the torque converter room 121 and a cylindrical transmission compartment in both instances 132 of the transmission case 130, extending from the rear side of the torque converter compartment 121, is a gear type oil pump 150 and an annular oil pump casing 151 which is centrally provided with a forwardly extending cylindrical portion 152 and fastened to the front end face of the transmission case 130 through a spigot fit. Fastened to the rear side of the oil pump body 151 is an oil pump cover 154 with a rearwardly extending cylindrical front support 153 which is coaxial with the afore-mentioned cylindrical portion 152. The oil pump casing 151 and oil pump cover 154 form an oil pump housing 155 which serves as a partition wall between the torque converter compartment 121 and the transmission compartment 132 and also as a front support wall for the transmission 300. Provided at a median position in the transmission compartment 132 of the transmission case 130 is an intermediate support wall 159 which is formed separately by casting, the intermediate support wall 159 partitioning the overdrive compartment 133 and the underdrive compartment 134 and being provided with a rearwardly extending cylindrical center support 158.

In a rear portion of the transmission case 130, a rear support wall 157 with a rearwardly extending cylindrical rear support 156 is formed integrally with the transmission case 130. Formed between the oil pump casing (the front support wall or partition wall) 155 and the rear support wall 157 is the transmission compartment 132 which receives the transmission 300, and formed between the rear support wall 157 and the extension housing 140 is an output shaft chamber 141 of the transmission. An electronically controlled sensor rotor 143 and a speedometer drive gear 144 are provided in the extension housing 140, and a sleeve yoke which is not shown is inserted in its rear end portion and coupled with a propeller shaft (not shown) coaxially with the front support 153.

Rotatably supported in the front support 153, on the inner side of the fixed shaft 203, is an input shaft 11 of the transmission, which serves also as the output shaft of the torque converter 200. This input shaft 11 is formed in a larger diameter in its rear end portion 12 which protrudes rearward from the front support 11 and provided with a flange portion 12a, the rear end portion 12 being provided with a center hole 13 along its axis. An intermediate transmission shaft 14 is mounted rotatably in a position rearward of the input shaft 11 in series and coaxially therewith. The intermediate transmission shaft 14 is fitted in the center hole 13 at its fore end which is rotatable in sliding contact with the inner peripheral wall of the center hole 13 through a metal bearing. Shaft 14 has a larger diameter in its rear end portion 15 which is provided with a rearwardly open center hole 16 along the axis thereof. An output shaft 36 is rotatably mounted rearward of and in series with the intermediate transmission shaft 14. This output shaft 36 is fitted in the center hole 16 at its fore end which is in sliding contact with the inner wall of the center hole 16 through a metal bearing. The output shaft 36 is splined in its intermediate portion 37 to a flange plate 82 with a rearwardly projecting shaft portion 81 in meshing engagement with the ring gear R2 of the third planetary gear set 80, and in its rear portion 38 to the afore-mentioned sleeve yoke, fixedly mounting the sensor rotor 143 and speedometer drive gear 144 in the output shaft compartment 141.

The first planetary gear set 20 is mounted rearward of the input shaft 11 in the overdrive compartment 133, having a ring gear R0 coupled with the intermediate transmission shaft 14 through the flange plate 22, a planetary carrier P0 coupled with the flange portion 12a of the input shaft 11 and a sun gear S0 formed on the inner race shaft 23. A rearwardly open first hydraulic servo drum 24 is fixedly mounted on the inner race shaft 23 on the front side of the first planetary gear set 20, and an annular piston 25 is fitted between the outer peripheral wall of the drum and the inner race shaft 23 to form a hydraulic servo C-0 for the clutch C0, mounting a return spring 26 on the side of the inner race shaft 23 and the clutch C0 on the inner side of the outer peripheral wall and coupling with the planetary carrier P0 through the clutch C0. A one-way clutch f0 having the inner race shaft 23 as its inner race is provided on the inner periphery of the first hydraulic servo drum 24 and, between an outer race 27 on its outer periphery and the transmission case 130, the clutch C0 and brake B0 are provided. A piston 29 is fitted in the front side of the center support wall 159 to form a hydraulic servo B-0 for the brake B0, and a return spring 32 is fitted in the inner periphery 31 of a fore end portion 31 of the intermediate support wall 159.

A rearwardly open second hydraulic servo drum 41 is rotatably fitted on the center support 159 in a front portion of the underdrive compartment 134, and an annular piston 42 is fitted between its inner and outer peripheral walls to form a hydraulic servo C-2 for the clutch C2, mounting a return spring 44 on the side of the inner peripheral wall and the clutch C2 on the side of the outer peripheral wall. Behind the second hydraulic servo drum 41, a rearwardly open third hydraulic servo drum 46 with an annular projection 35 on its front side is fixedly mounted on a rear end portion 15 of the intermediate transmission shaft 14. An annular piston 47 is fitted between the just-mentioned rear end portion 15 and the outer peripheral wall to form a hydraulic servo C-1 for the clutch C1, mounting a return spring 49 on the inner peripheral side of the clutch C1 and mounting the clutch C2 on the outer periphery of the annular projection 35. The second and third hydraulic servo drums 41 and 46 are coupled through the clutch C2. Provided behind the third hydraulic servo drum 46 is the second planetary gear set 50 having its ring gear R1 coupled with the third hydraulic servo drum 46 through the annular projection 48 and clutch C1, a planetary carrier P1 splined on a fore end portion of the output shaft 36, and a sun gear S1 formed integrally with the sun gear shaft 45. A connecting drum 60 which is so shaped as to cover the second and third hydraulic drums 41 and 46 and the second planetary gear set 50 in a minimum space is fixed at its fore end to the outer periphery of the second hydraulic servo drum 41, and connected at its rear end to the sun gear shaft 45 at a position behind the second planetary gear set 50, with a belt brake B1 on the outer periphery thereof.

Brake disks b2 of the B2, outer spline 725 of a fourth hydraulic servo drum 72 and brake disks b3 of the brake B3 are fitted from the front side in spline 75 which is formed on the inner side of the transmission case 130 behind the brake B2, and a piston 77 is fitted in an annular hole between the outer periphery of the rear support 156 of the rear support wall 157 and the transmission case 130 to form a hydraulic servo B-3 for the brake B3, supporting the return spring 79 of the hydraulic servo B-3 by a retainer 87 which is mounted at the fore end of the rear support 156.

The third planetary gear set 80 has a sun gear S2 formed integrally with the sun gear shaft 45, a carrier P2 coupled with the outer race 86 of the forwardly located clutch F2 and with the brake B3, and a ring gear R2 provided with a parking gear 85 around the circumference thereof and coupled with an intermediate portion 37 of the output shaft 36. When the shiftlever of the automatic transmission is set in "parking" (P) position, the parking gear 85 is meshed with a parking pawl 84 to fix the output shaft 36.

Figure 3:
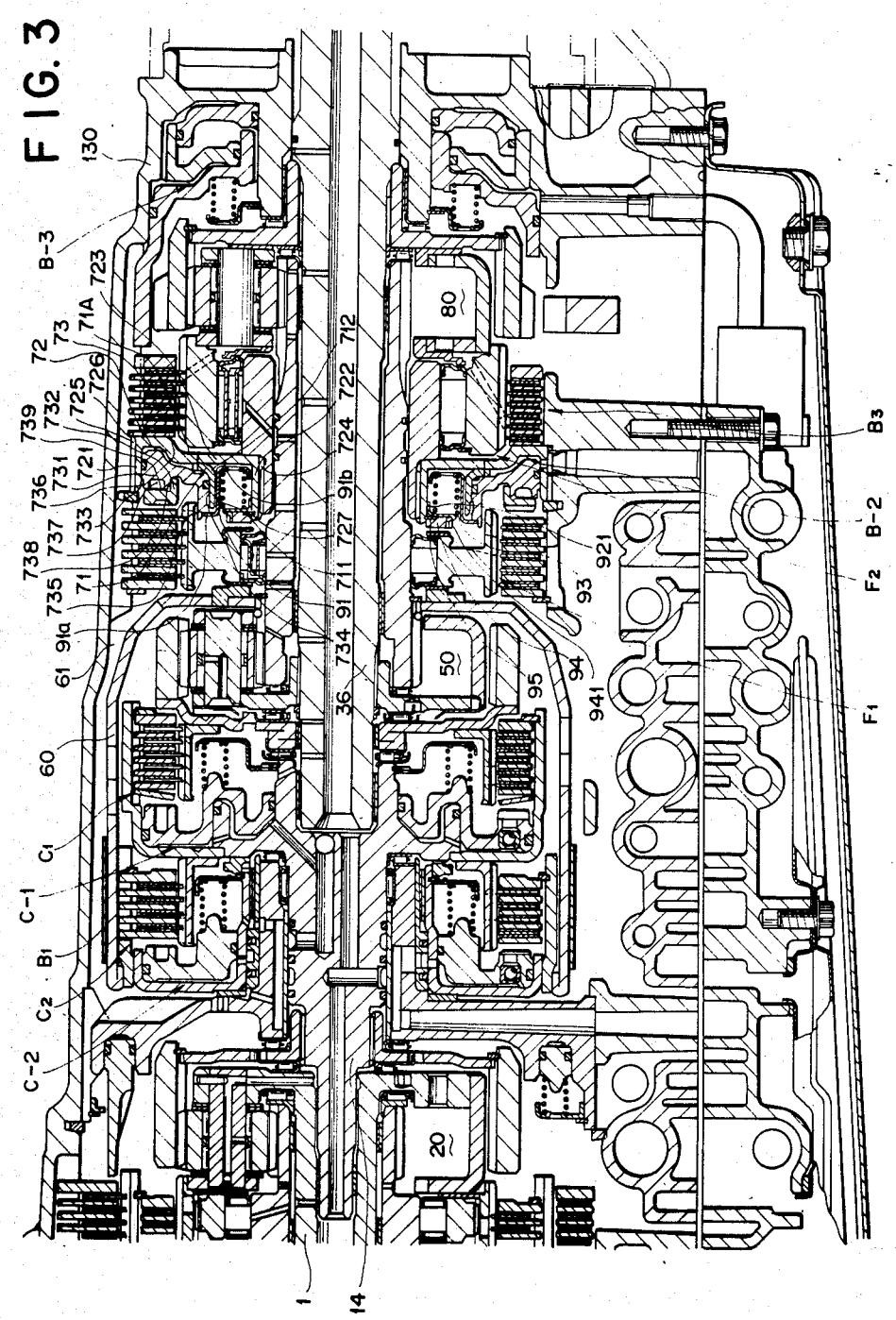
FIG. 3 is a schematic section showing major components of the transmission of FIG. 2.
Figure 8:
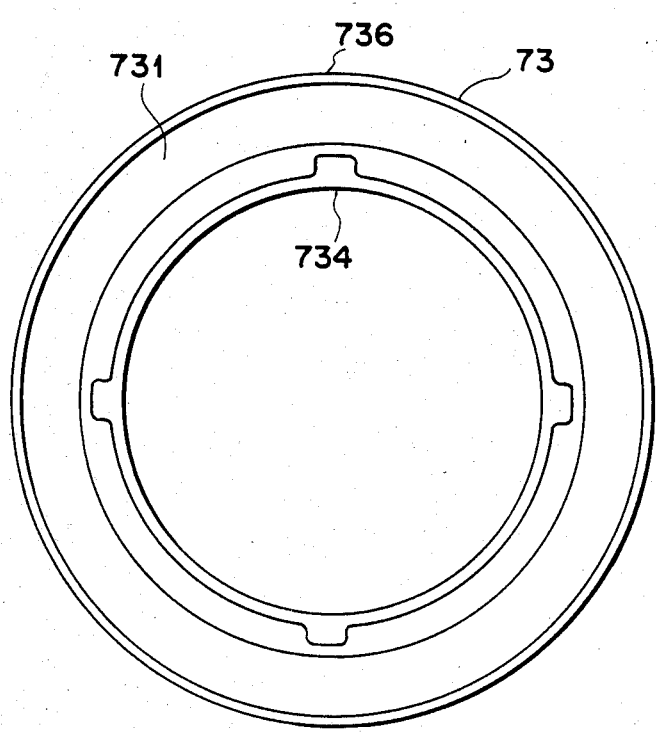
FIG. 8 is another front view of the piston employed by the hydraulic servo of the invention.
Figure 9:
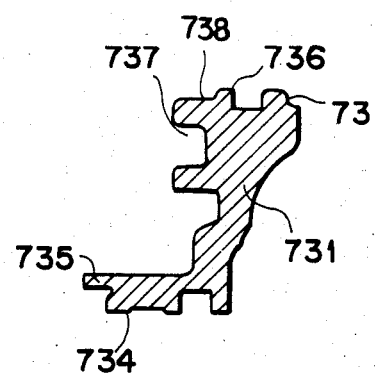
FIG. 9 is an enlarged sectional view of the piston of FIG. 7.
Figure 10:
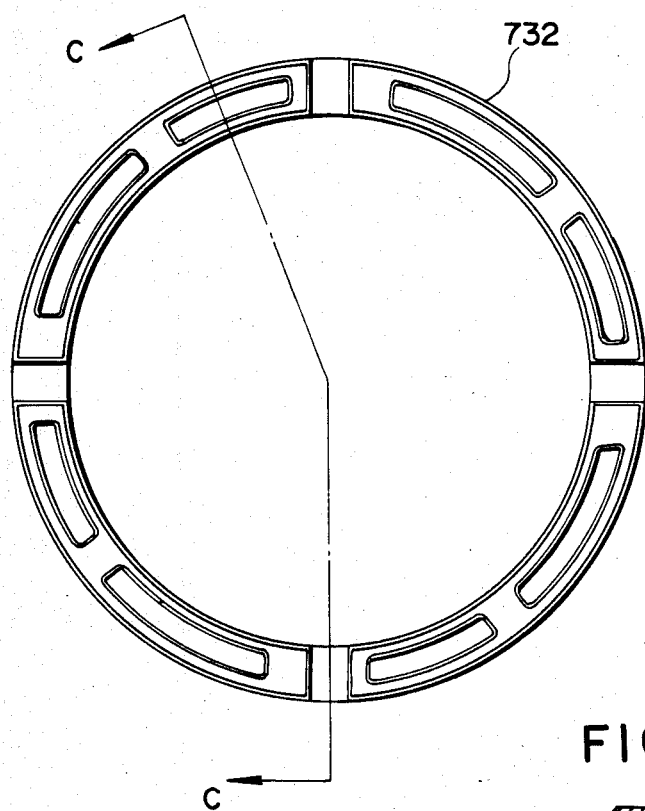
FIG. 10 is a front view of an adaptor sleeve.
Figure 11:
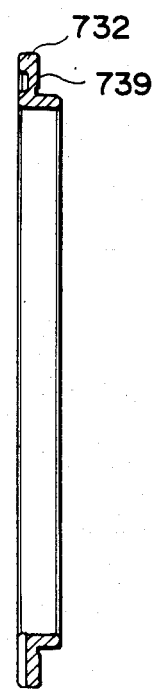
FIG. 11 is a section taken on line C—C of FIG. 10.
Figure 12:
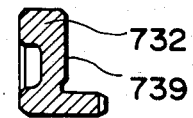
FIG. 12 is an enlarged sectional view of the adaptor sleeve of FIG. 11.
Figure 13:
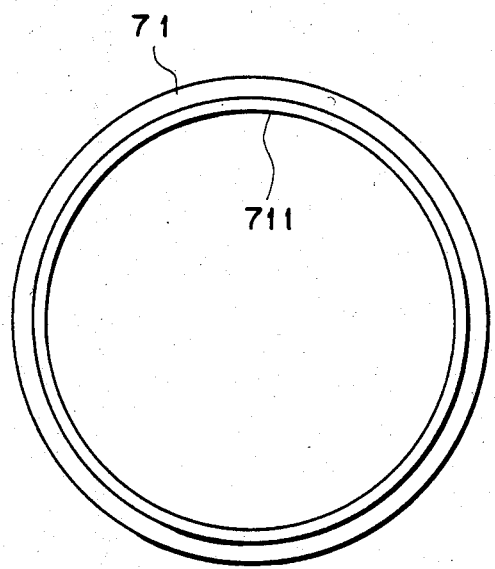
FIG. 13 is a front view of an intermediate cylinder member of the hydraulic servo according to the invention.
Figure 14:
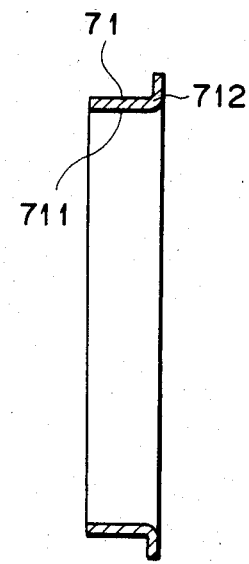
FIG. 14 is a sectional view of the intermediate cylinder member of FIG. 13.
Figure 17:
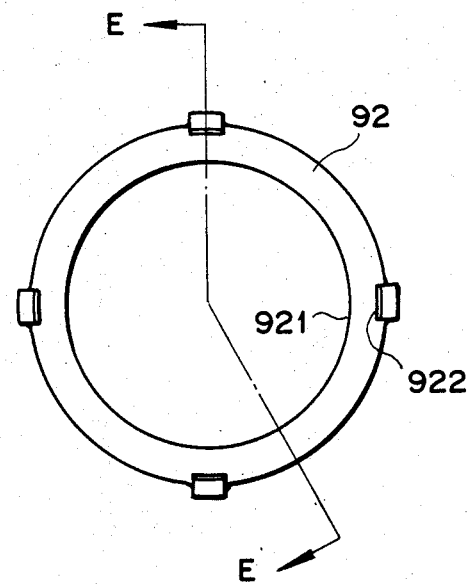
FIG. 17 is a front view of a retainer of the hydraulic servo according to the invention.
Figure 18:
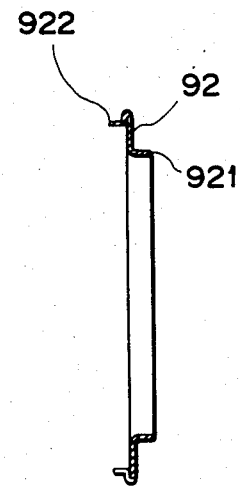
FIG. 18 is a section taken on line E—E of FIG. 16.

As shown in FIG. 3, the hydraulic servo 1 according to the invention is mounted in an extra space 61 outside the connecting drum 60 on the outer side of the second planetary gear set 50. The hydraulic servo 1 has an annular fourth hydraulic servo drum 72 including an outer cylinder 721, an inner cylinder 722 and a side wall 723 connecting the outer and inner cylinders and open on the front side as shown in FIGS. 4 and 5 to serve as a reaction plate for return springs which will be described hereinlater. The servo drum 72 is formed into a U-shape in section by press-forming and provided with inner spline 724 on its inner periphery and with outer spline 725 on its outer periphery for splined engagement with the transmission case 130, the drum being fixed to the transmission case 130 in the rotational direction by the outer spline 725 and fixed in the axial direction by a snap ring 733 and a stepped portion 726 formed on the transmission case 130, receiving the pressure of the brake B3 behind the hydraulic servo. A similarly press-formed intermediate cylinder member 71 is joined to the fourth hydraulic servo drum 72 through a weld 71A to prevent leaks of oil pressure from the hydraulic servo, and, as shown in FIGS. 6 to 9, a piston 73 is fitted between the fourth hydraulic servo drum 72 and the intermediate cylinder member 71 projected from a predetermined position on the fourth hydraulic servo drum 72 to form a hydraulic servo B-2 for the brake B2. The piston 73 includes: a piston body 731 formed with a guide sleeve 73d at the tip end 73c on one end face 73b of its inner periphery 73a to guide one end 91a of a spring seat 91 or a connecting member into a predetermined position as will be described hereinlater, and provided with forwardly open holes 737 in an end portion 738 on the side of its outer periphery 736; and an adaptor sleeve 732 (FIGS. 10 to 12) covering the end portion 738 of the piston body 731 with the rear side 739 of an L-shaped wall. This piston construction facilitates assembling of the snap ring 733 which fixes the fourth hydraulic servo drum 72 to the transmission case 130, and the intermediate cylinder member 71 defines an area of a suitable diameter for the piston 73.

As shown also in FIGS. 15 to 18, the return biasing means 90 includes: a spring seat 91 having one end 91a thereof fixed in a predetermined position under guidance of the guide sleeve 73d at the tip end 73c of one end face 73b on the inner peripheral side 73a of the piston 73 and the other end 91b folded to extend along the inner periphery 711 of the intermediate cylinder 71 and around the other end 712 thereof; a retainer 92 having one end 921 thereof secured to one end 727 of the inner cylinder 722 and the other end 922 folded into engagement with the outer periphery of a ring 94 which is fixed in position by a snap ring 95 fixed on one end 727 of the inner cylinder 722; and return springs 93 interposed between the spring seat 91 and retainer 92.

The transmission 300 engages or releases the respective clutches and brakes by the oil pressure which is selectively supplied to the hydraulic servos of the friction coupling elements according to the vehicle speed, throttle opening or other operating conditions of the vehicle by the hydraulic control system 400 in a valve casing 403 in an oil pan 401 which is fastened to the lower side of the transmission case 130, thereby effecting shifts to and from four forward and one reverse speed ranges. Table 1 below shows one example of speed ranges established by engagement and release of the respective clutches, brakes and one-way clutches.

TABLE 1

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |

TABLE 1-continued

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| | 2 | E | E | X | X | X | E | X | (L) | L | f |
| | 3 | E | E | E | X | X | E | X | (L) | f | f |
| | 4 | X | E | E | E | X | E | X | f | f | f |
| S | 1 | E | E | X | X | X | X | X | (L) | f | L |
| | 2 | E | E | X | X | E | E | X | (L) | (L) | f |
| | 3 | E | E | E | X | X | E | X | (L) | f | f |
| L | 1 | E | E | X | X | X | X | E | (L) | f | (L) |
| | 2 | E | E | X | X | E | E | X | (L) | (L) | f |

In Table 1, the letter "E" indicates an engaged state of the corresponding clutch or brake, and "L" indicates that the corresponding one-way clutch is engaged only in engine-drive operation and not in engine-brake operation. Further, the letter "(L)" indicates a "locked" state in which the corresponding one-way clutch is engaged in engine-drive operation but its engagement is not necessarily required since the power is delivered by a parallelly mounted clutch or brake. The small letter "f" indicates a free state of the corresponding one-way clutch, and the cross "X" indicates a released state of the corresponding clutch or brake.

What is claimed is:

1. A hydraulic servo for a friction coupling element in an automatic transmission including a casing, comprising:
   an annular drum fixed to the automatic transmission casing and having an outer cylinder, an inner cylinder, a sidewall connecting said outer and inner cylinders, and an intermediate cylinder connected to the sidewall between the outer and inner cylinders to divide the interior of said drum into outer and inner annular spaces;
   a piston slidably mounted within said outer annular space, between the outer and intermediate cylinders, said piston having a terminal axially extending guide sleeve portion; and
   return biasing means including:
      a connecting member having one end fixed to said piston and abutting said guide sleeve portion and the other end located in said inner annular space, between the inner cylinder and the intermediate cylinder;
      a retainer fixed to the inner cylinder, at a position axially inward of said guide sleeve with respect to said sidewall when said piston is fully retracted, and;
      return springs interposed within said inner annular space between said other end of said connecting member and said retainer.

2. A hydraulic sero in accordance with claim 1 wherein said inner cylinder is splined to another coupling element at its inner surface.

3. A hydraulic servo in accordance with claim 1 additionally comprising:
   a ring member mounted against the interior surface of said inner cylinder and held axially by a snap ring, said retainer being folded to extend along two sides of said ring.

4. A hydraulic servo for a friction coupling element in an automatic transmission including a casing, comprising:
   an annular drum fixed to the automatic transmission casing and having an outer cylinder, an inner cylinder, a sidewall connecting said outer and inner cylinders and an intermediate cylinder connected to the sidewall between the outer and inner cylinders to divide the interior of said drum into outer and inner annular spaces;
   a piston slidably mounted within said outer annular space, between the outer and intermediate cylinders, said piston having an axially extending pressing portion for pressing against the friction coupling element and a depending cylindrical skirt portion extending around the inner periphery of said piston and radially spaced from said pressing portion, said skirt having a first cylindrical portion and a second cylindrical portion of lesser diameter than and axially extending from said first cylindrical portion, with a radially extending step at the juncture of said first and second cylindrical portions; and
   return biasing means including:
      a connecting member having one end fixed to said radially extending step and abutting said second cylindrical portion, and its other end located in said inner annular space, betweenn the inner cylinder and the intermediate cylinder;
      a retainer fixed to the inner cylinder at a position axially inward of said guide sleeve with respect to said sidewall when said piston is fully retracted within said drum; and
      return springs interposed within said inner annular space between said other end of said connecting member and said retainer.

5. A hydraulic servo in accordance with claim 4 additionally comprising:
   a ring member mounted against the interior surface of said inner cylinder and held axially by a snap ring, said retainer being folded to extend along two sides of said ring.

* * * * *

UNITED STATES PATENT AND TRADEMARK OFFICE
CERTIFICATE OF CORRECTION

PATENT NO. : 4,690,037
DATED : September 1, 1987
INVENTOR(S) : Koji SUMIYA et al It is certified that error appears in the above—identified patent and that said Letters Patent is hereby corrected as shown below:

Col. 2, line 4 "friction devices" should read --friction coupling devices--.

Col. 3, line 51 "room" should read --compartment--; and lines 51-52 delete "in both instances".

Col. 8, line 1 "sero" should read --servo--.

Signed and Sealed this

Twelfth Day of April, 1988

Attest:

DONALD J. QUIGG

*Attesting Officer*    *Commissioner of Patents and Trademarks*